United States Patent
Holloway et al.

(10) Patent No.: US 8,065,609 B2
(45) Date of Patent: *Nov. 22, 2011

(54) INTERACTIVE SURVEYING

(75) Inventors: Lane Thomas Holloway, Pflugerville, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 487 days.

This patent is subject to a terminal disclaimer.

(21) Appl. No.: 12/325,700

(22) Filed: Dec. 1, 2008

(65) Prior Publication Data
US 2009/0132904 A1 May 21, 2009

Related U.S. Application Data

(63) Continuation of application No. 09/925,585, filed on Aug. 9, 2001, now Pat. No. 7,475,339.

(51) Int. Cl.
*G06F 17/00* (2006.01)
(52) U.S. Cl. ........................... 715/237; 715/234
(58) Field of Classification Search .......... 715/221–224, 715/255, 234, 237; 434/322
See application file for complete search history.

(56) References Cited

U.S. PATENT DOCUMENTS

| | | | |
|---|---|---|---|
| 5,893,098 A | 4/1999 | Peters et al. |
| 6,826,540 B1 | 11/2004 | Plantec et al. |
| 6,895,405 B1 | 5/2005 | Choi et al. |
| 6,993,495 B2 | 1/2006 | Smith et al. |
| 7,158,988 B1 | 1/2007 | Kirkpatrick et al. |
| 7,475,339 B2 | 1/2009 | Holloway et al. |
| 2002/0007303 A1 | 1/2002 | Brookler et al. |
| 2002/0029154 A1 | 3/2002 | Majoor |
| 2002/0119433 A1 | 8/2002 | Callender |
| 2002/0120491 A1 | 8/2002 | Nelson |
| 2002/0128898 A1 | 9/2002 | Smith, Jr. et al. |
| 2002/0184265 A1 | 12/2002 | Gupta |
| 2003/0033193 A1 | 2/2003 | Holloway et al. |
| 2003/0088452 A1 | 5/2003 | Kelly |
| 2004/0230989 A1 | 11/2004 | Macey et al. |
| 2008/0010351 A1 | 1/2008 | Wardhaugh et al. |

*Primary Examiner* — Stephen Hong
*Assistant Examiner* — Manglesh Patel
(74) *Attorney, Agent, or Firm* — Yee & Associates, P.C.; Steven L. Bennett

(57) ABSTRACT

A survey document is provided on a server, for delivery to a client on a network, having questions and potential answers in a format defining branches of the questions. Programming instructions are also provided on the server for delivery to the client on the network. The instructions are for causing the client to render questions on a user interface from the survey document. The questions initially rendered include a first one of the questions. The instructions are also for causing the client to branch to and render on the user interface second or third ones of the questions responsive to the survey document and an answer received for the first question.

8 Claims, 8 Drawing Sheets

INTERACTIVE SURVEYING

This application is a continuation of application Ser. No. 09/925,585, filed Aug. 9, 2001, and issued on Jan. 6, 2009 as U.S. Pat. No. 7,475,339.

BACKGROUND

1. Field of the Invention

This invention concerns a method, apparatus and computer program product relating to delivering survey questions, and more particularly to delivering on-line surveys that dynamically present questions responsive to answers received.

2. Related Art

On-line surveys suffer from some problems. First, they are not interactive. That is, conventionally all possible questions are displayed in a survey form, irrespective of answers that a user gives when filling out the form. Therefore, even if a certain answer precludes a certain following set of questions, the certain questions are still displayed after the user selects the certain answer. Also, on-line survey forms are conventionally created individually, one-by-one. That is, the survey exists on a server as a collection of (possibly numerous) forms, each for individual delivery to a client. It is problematic that if a new question has to be added to the survey its addition may affect many or even all the existing survey forms, so that may or all the forms have to be modified. Therefore, a need exists for improvements in delivery and handling of surveys.

SUMMARY OF THE INVENTION

The foregoing need is addressed in the present invention by providing a survey document on a server for delivery to a client on a network having questions and potential answers in a format defining branches of the questions. That is, the format defines whether a first one of the questions branches to a second one of the questions, or instead to a third one of the questions, and so on, depending on an answer for the first question.

According to one aspect, the format of the survey document defines the questions and answers as data elements that are included in the survey document as strings of text surrounded by text markups, including tags. The text markups describe the data elements. The question branches are defined by the markups as associations among the data elements. In one embodiment, the format is an extensible markup language format.

In another aspect, programming instructions, such as in a Java applet associated with an HTML document, are provided for delivery to the client on the network. The instructions are for causing the client to render questions on a user interface from the survey document. The questions initially rendered include the first one of the questions. The instructions are also for causing the client to branch to and render on the user interface the second or third one of the questions responsive to the survey document and an answer received for the first question.

It is advantageous that the programming instructions and survey document provide the ability to branch based on a previous answer, according to which the survey will display new sub-questions (and potential answers) for the newly answered question, depending on the answer given. Moreover, first sub-questions can themselves branch to second sub-questions, which can branch to third sub-questions, and so on.

It is also advantageous that the survey document resides in the above described form on the server because the single survey document may be easily revised, without having to revise numerous forms on the server. Then the applet, running on a client's browser, for example, will render the survey in browser frames.

In another aspect, the programming instructions include instructions for causing the client to parse the data elements from the survey document into data arrays. The data arrays include cross-references defining associations among questions and answers. The arrays provide an efficient data structure by which the applet can follow a chain of cross references and compile, for adding to the survey, branches of sub-questions for particular answers received from a user.

In yet another aspect, a data type definition file is also provided for delivery to the client on the network. According to this aspect, the programming instructions include instructions for causing the client to validate the data elements responsive to the document type definition file.

In a still further aspect, the programming instructions include instructions for causing the client to return the survey results to the server as a document defining the answers as data elements that are included in the survey document as strings of text surrounded by text markups, including tags. The text markups describe the data elements. This is advantageous because this document format is widely known and well supported, so that it permits the survey results to be interpreted and manipulated by a wide variety of applications.

Other objects and advantages of the invention will become apparent upon reading the following detailed description and upon reference to the accompanying drawings.

DETAILED DESCRIPTION OF THE INVENTION

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
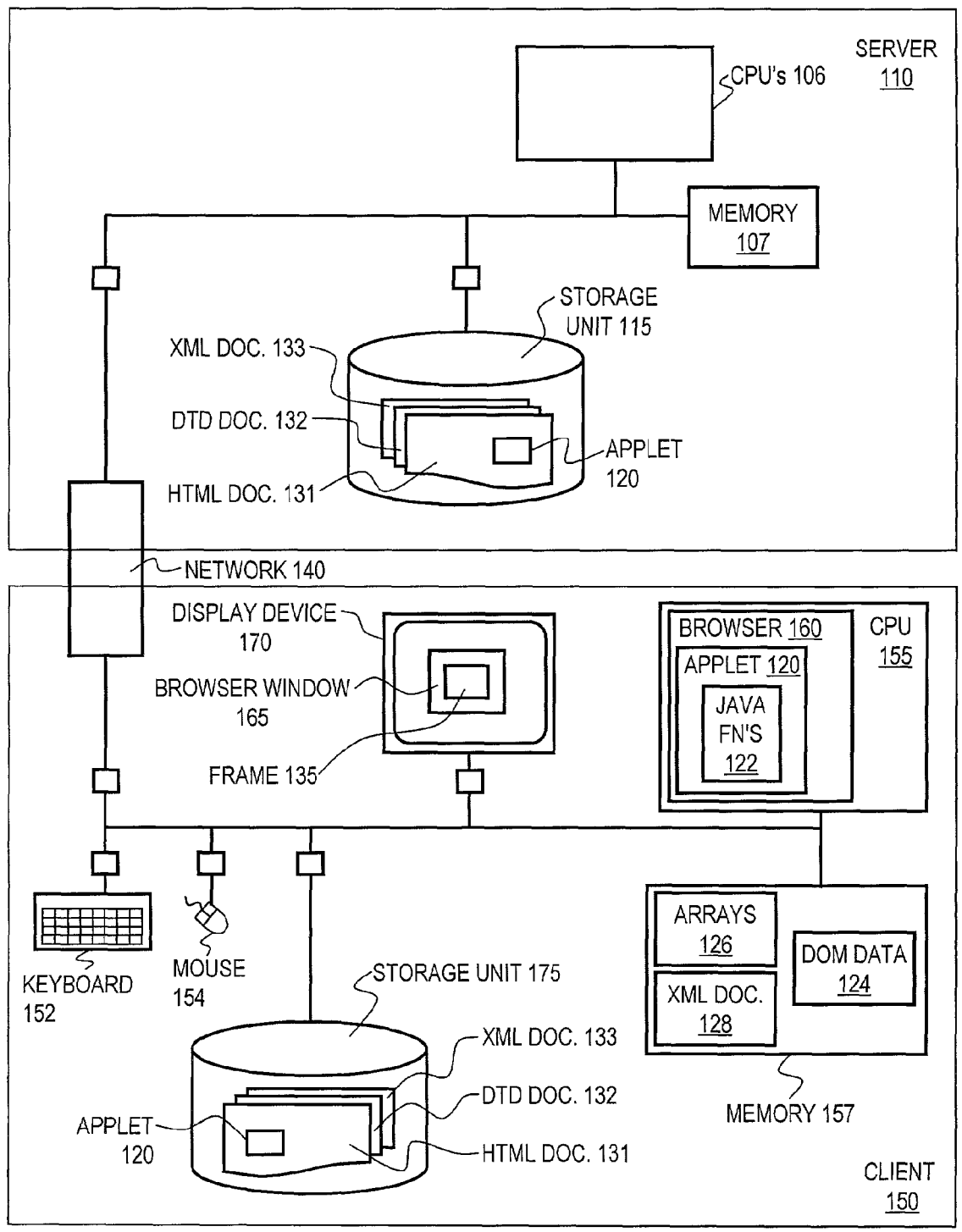
FIG. 1 illustrates a computer system that is generally applicable for an embodiment of the invention, and networking aspects of the present invention in the context of the World Wide Web, according to an embodiment of the invention.

Referring now to FIG. 1, aspects of an embodiment of the present invention are illustrated in the context of the World Wide Web, an open community of hypertext-enabled document servers and readers on the Internet. That is, client 150 is connected to a server 110 by a network 140, so that the client 150 can obtain web pages, such as hypertext markup language ("HTML") document 131, data type definitions ("DTD's), such as DTD document 132, and data, such as extensible markup language ("XML") document 133 from the server 110, which has CPU's 106. In the embodiment shown, the pages are stored by the server 110 in a first storage unit 115, and copies are delivered to the client's storage unit 175. The client 150 executes a browser 160 program on its CPU 155, for rendering an image of the HTML document 131 in a frame 135 of browser window 165 on the client's display 170, which is a type of user interface. The client 150 of the embodiment depicted includes user input devices keyboard 152 and mouse 154.

The HTML document 131 includes an applet 120, which has instructions in a Java format. (Java is a trademark of Sun Microsystems, Inc.) The Java applet is a non-standalone application in Java code that runs inside a browser such as browser 160. Among other aspects, Java is an object oriented, interpreted, dynamic programming language. This means that data and methods that operate on that data are collected as classes. The classes describe the state and behavior of respective objects and are arranged in a hierarchy so a subclass can inherit behavior from its superclass. Being an interpreted language, the Java applet is compiled as byte codes for a Java virtual machine, rather than native machine code. In this manner the applet is less platform dependent, since the applet can run on any platform to which the Java virtual machine has been ported. Being dynamic, classes of the applet 120 can be loaded into a running Java interpreter at anytime and then dynamically instantiated.

XML is a hierarchical data format, according to which data elements can be nested within other data elements and can have associated attributes. The XML document 133 in this embodiment is a survey document in which survey questions and answers are defined as XML data elements. That is, the XML file contains all the survey questions along with information about what type of answers are expected and if the answers are dependent on previous answers to previous questions. The questions and answers are included in the survey XML document 133 as strings of text surrounded by text markups, including tags that describe the data elements, and attributes that define associations among the data elements, e.g., questions and answers. These association define, among other things, question branches, which will be described further in connection with FIG. 2 hereinbelow.

The DTD document 132 defines what elements may appear in the XML document 133, and defines contents and attributes for the elements. The applet 120 has Java functions 122 that parse data elements of the XML document 133 into a number of data arrays 126 stored in the client 150 memory 157, which will be described further in connection with FIG. 3 hereinbelow. In connection with parsing the XML document 133, the Java functions 122 validate the data in the XML document 133 responsive to the DTD document 132. Validating operates on the principle that everything not defined in the DTD document 132 is forbidden. That is, everything in the XML document 133 must match a declaration in the DTD document 132.

Responsive to receiving user inputted survey answers the applet 120 updates the survey data, creating a document object model ("DOM") data structure 124 in memory 157. Then the applet 120 creates a responding XML document 128 in memory 157. The responding XML document 128 is for survey results and includes the user inputted answers. The responding XML document 128 is then sent back to the server 110.

Figure 2:
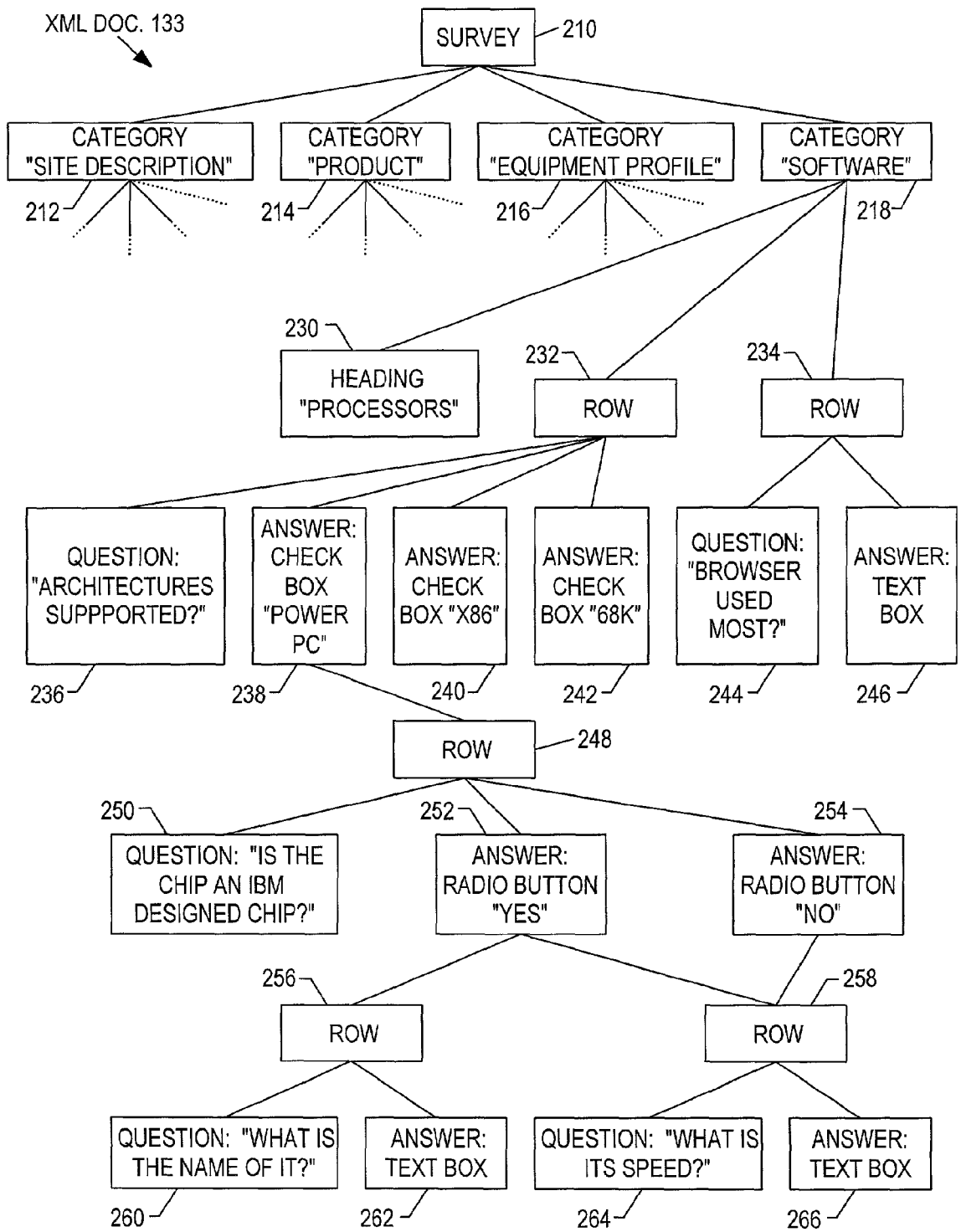
FIG. 2 illustrates structure of an XML document providing survey questions and answers, according to an embodiment of the invention.

Referring now to FIG. 2, the structure of XML document 133 is illustrated figuratively, according to an embodiment. The root node 210 is a data element defining the document 133 as a survey document. The document 133 defines questions and answers for a survey. In the illustrated embodiment, the survey relates to hardware and software development. Branching from the root node 210 are nodes 212, 214, 216, and 218, which are data elements defining categories of the survey questions and answers. Node 212 defines a category of questions and answers relating to a site description. Node 214 defines a category of questions and answers relating to products. Node 216 defines a category of questions and answers relating to equipment profiles. Node 218 defines a category of questions and answers relating to software.

The questions and answers for each of these categories 212 through 218 are for displaying in respective frames of the browser window 165 (FIG. 1). According to the embodiment, each of the categories has a number of questions and answers; however, for the illustration only questions and answers for the software category node 218 are shown. Moreover, only selected ones of the questions and answers for the software category are shown for the illustration. Branching from node 218 is a heading node 230 which indicates that sub-questions thereunder relate to processors.

Associated with the processor heading is a first row 232 and a second row 234 of questions and answers. The question 236 for the first row 232 is "architecture's supported?" The first possible answer 238 is "Power PC." The second possible answer 240 is "X86." The third possible answer 242 is "68K." All the possible answers for question 236 are check boxes. The question 244 for the second row 234 is "Browser used most?" The answer 246 is a text box, in which the client 150 (FIG. 1) user may enter text.

One of the answers, answer 238, branches to a row 248 of sub-questions and answers. That is, answer 238 has associated with it the row 248 of sub-questions and answers. The first sub-question 250 is "Is the chip an IBM designed chip?" The first possible answer 252 to this question 250 is a radio button representing "yes." The second possible answer 254 to this question 250 is a radio button representing "No."

There are two rows 256 and 258 of questions and answers associated with the answer 252 "Yes." There is one row 258 of questions and answers associated with the answer 254 "No." The question 260 for the first row 256 is "What is the name of it?" The associated answer 262 is a text box. The question 264 for the second row 258 is "What is its speed?" The associated answer 266 is a text box.

Figure 3:
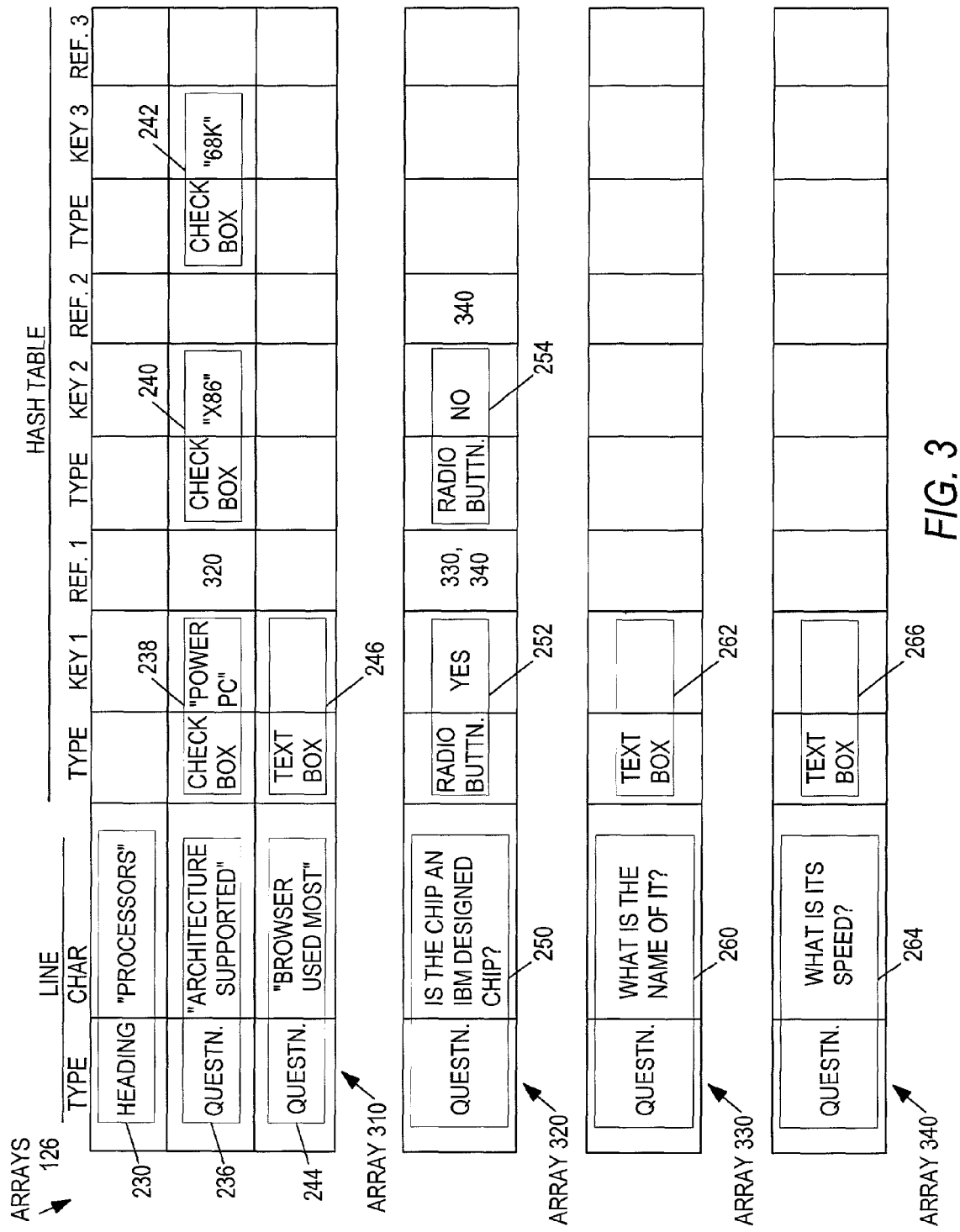
FIG. 3 illustrates structure of arrays created on a client responsive to the XML document by Java functions that exist within an applet, according to an embodiment of the invention.

Referring now to FIG. 3, the structure of arrays 126 are illustrated, according to an embodiment. The arrays 126 are data structures created responsive to the XML document 133 (FIGS. 1 and 2) by the Java functions 122 (FIG. 1) that exist in memory 157 (FIG. 1) accessible by the applet 120 (FIG. 1). Array 310 is the first one of the arrays 126 and has all the headings, questions and potential answers that are initially displayed in a frame of the browser 160 (FIG. 1) for the software category 218 (FIG. 2). A portion of the array 310 constitutes a hash table which points to additional questions and answers which may also be added to the initial questions and answers in the frame, depending on which answers a user selects. That is, in hash table convention, answers constitute keys with associated cross references to other arrays. For example, for question 236, answer 238 "Power PC" has an associated cross reference which points to array 320, that includes a sub-question 250 and answers 252 and 254 for adding to the frame responsive to the user selecting the answer "Power PC" for question 236. Answer 252 is a key that points to arrays 330 and 340. answer 254 is a key that points to array 340. Array 330 includes a sub-question 260 and sub-answer 262. Array 340 includes a sub-question 264 and sub-answer 266.

Figure 4:
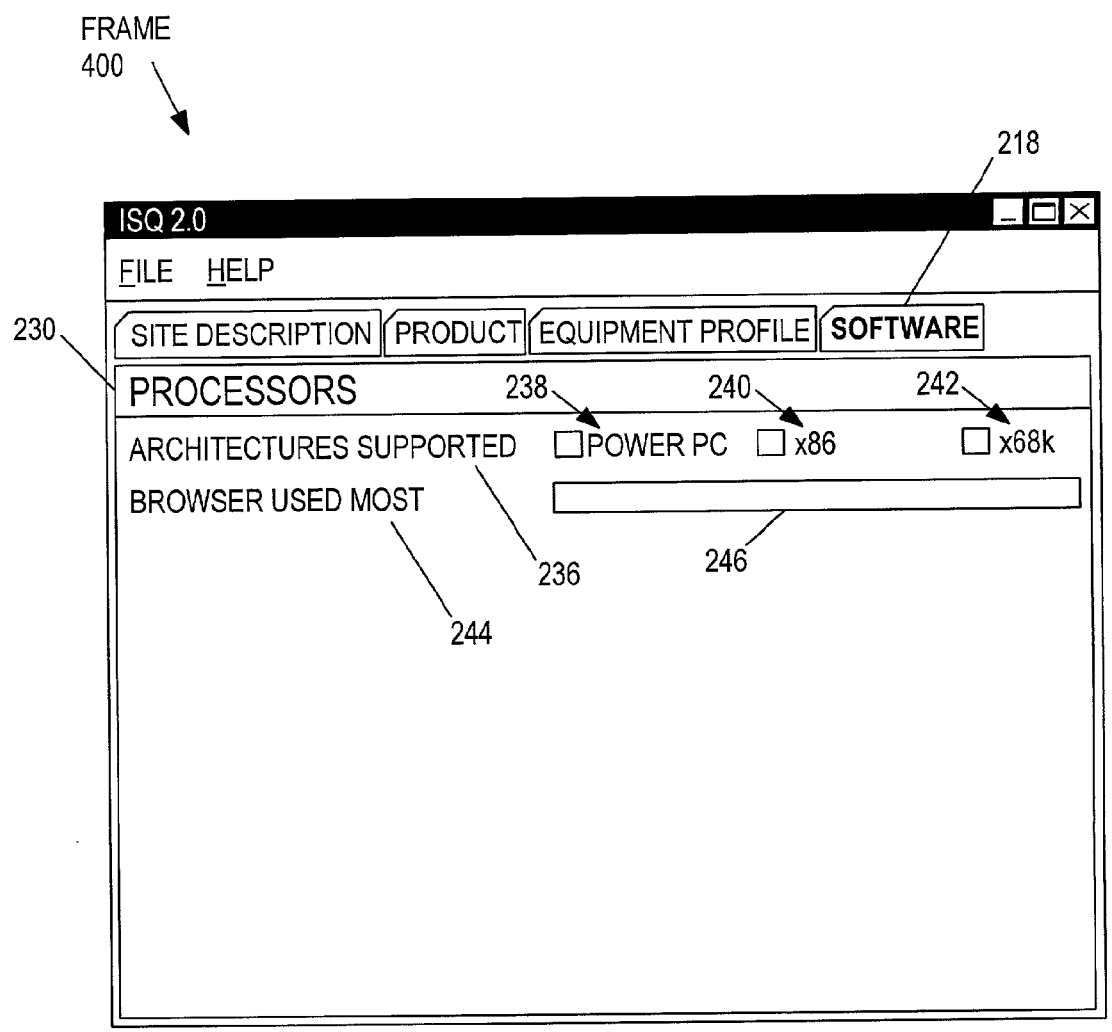
FIG. 4 illustrates initial survey questions and answers shown in a frame displayed in a window of a browser by the client, according to an embodiment of the invention.

Referring now to FIGS. 3 and 4 together, initial questions and answers, i.e., questions 236 and 244 and answers 238, 240, 242 and 246 of array 310 (FIG. 3), are shown in a frame 400 (FIG. 4) displayed in a window 165 (FIG. 1) of the browser 160 (FIG. 1). That is, heading 230 is rendered immediately below the displayed category 218 of questions and answers. Immediately below the heading 230 are two rows of questions and answers. In the first row is question 236 followed by answers 238, 240, and 242 which the user may select. In the second row is question 244 followed by the text box answer 246 in which the user may enter text.

Figure 6:
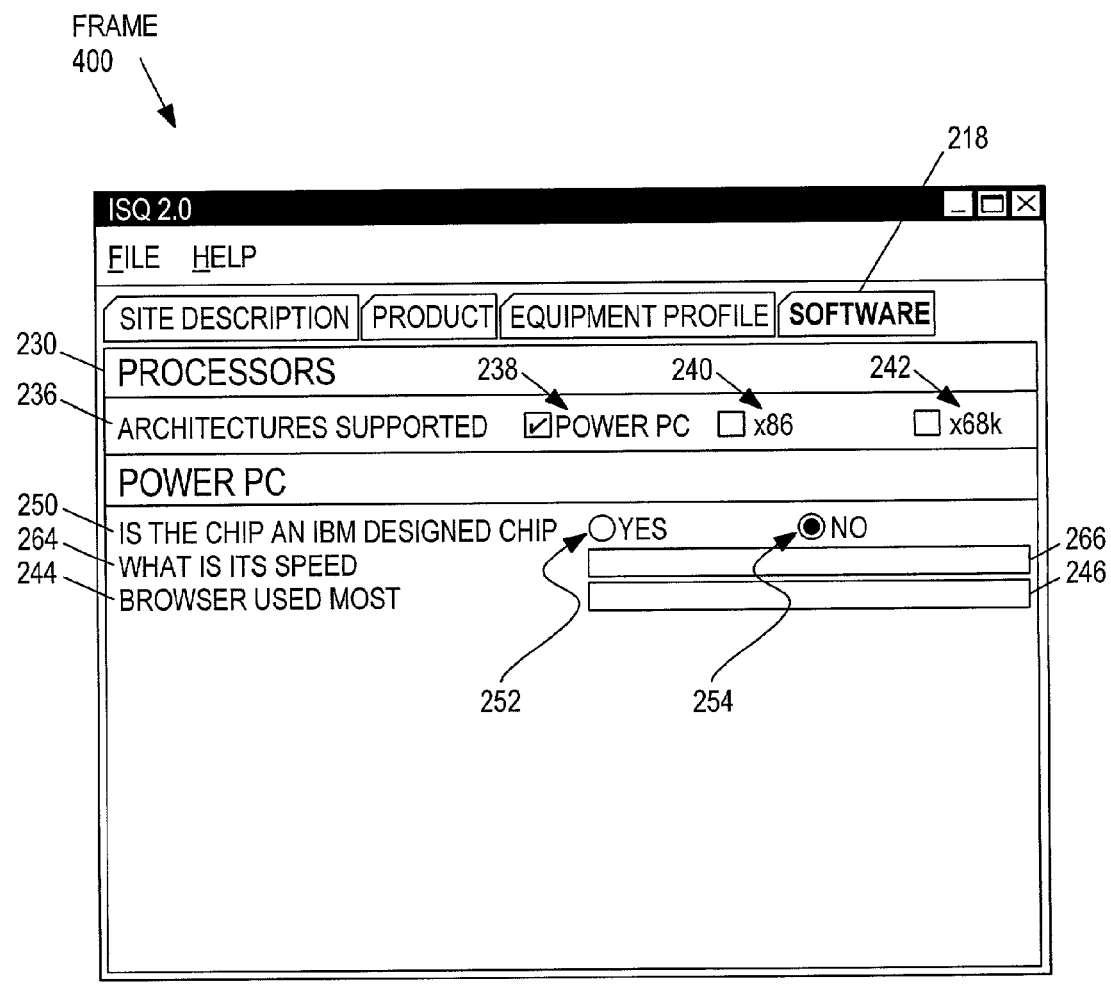
FIG. 6 illustrates the frame for an instance where the user has selected a different set of answers, according to an embodiment of the invention.

Referring now to FIGS. 3 and 6 together, the frame 400 (FIG. 6) is shown for an instance where the user has selected answer 238 and has also selected answer 254 (instead of answer 252). Since answer 254 cross references only the questions and answers in array 340 (FIG. 3), but not those in array 330 (FIG. 3), in this instance of the frame 400 the question 264 and answer 266 in array 340 are rendered in addition to the initial questions and answers in array 310, but question 260 and answer 262 in array 330 are not.

Figure 5:
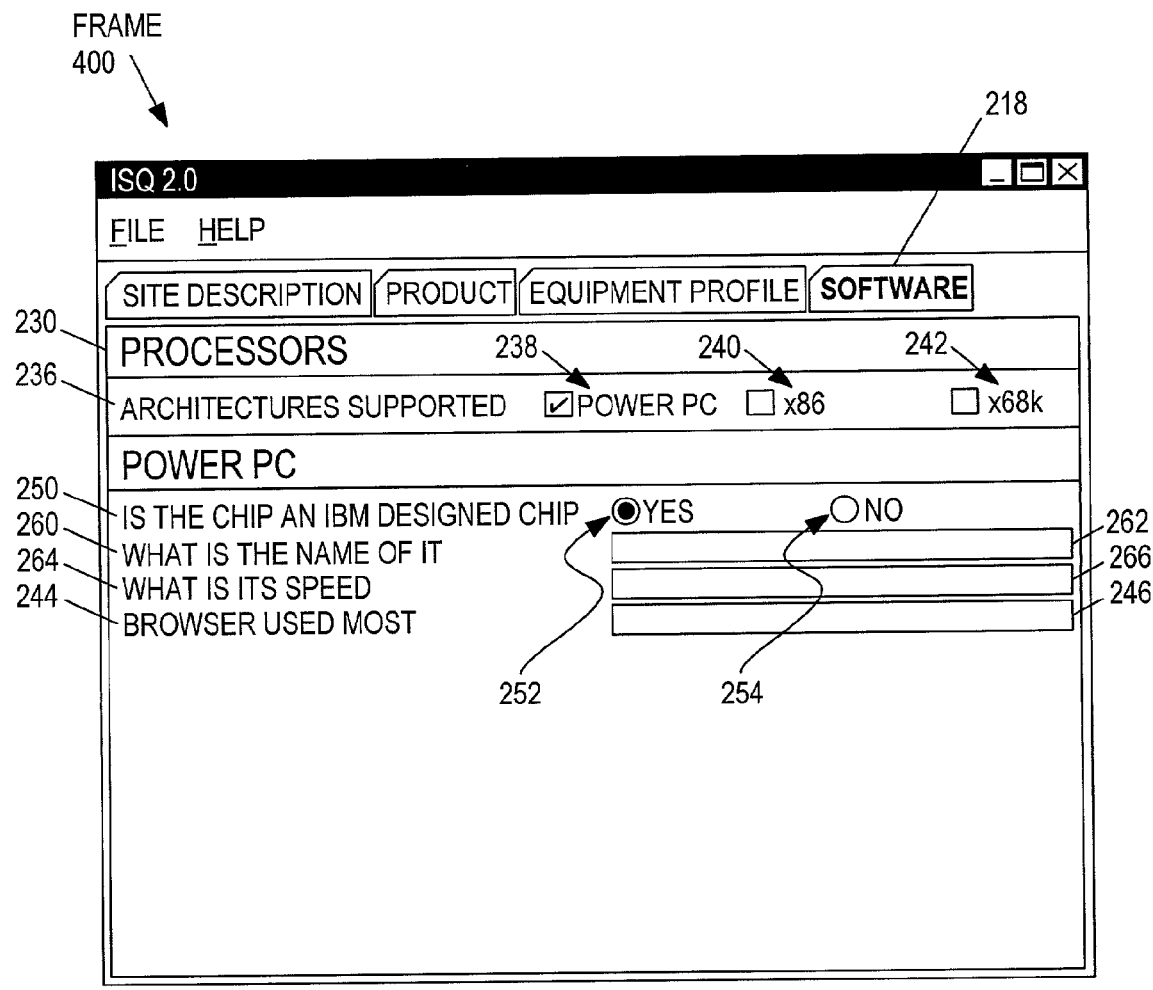
FIG. 5 illustrates the frame for an instance where the user has selected a certain set of answers, according to an embodiment of the invention.

Referring now to FIGS. 3 and 5 together, the frame 400 (FIG. 5) is shown for an instance where the user has selected answer 238. Answer 238 in array 310 (FIG. 3) cross references questions and answers in array 320. Therefore, in addition to the initial questions and answers in array 310 the question 250 and answers 252 and 254 in array 320 are displayed in the frame 400 in the instance illustrated in FIG. 5. Also, according to the embodiment, the first possible answer 252 to question 250 in array 320 is assumed to be the default answer. Answer 252 cross references questions and answers in both arrays 330 and 340, that is, questions 260 and 264 and answers 262 and 266. Therefore, both sets of the questions and answers for arrays 330 and 340 are also displayed in the frame 400 in this instance.

Thus, FIG. 6 illustrates Java functions 122 branching from question 250 to question 264 (and its answer) for rendering by the browser 160 responsive to the user selecting answer 254; whereas FIG. 5 illustrates Java functions 122 branching from question 250 to not only sub-question 264 (and its text box for an answer), but also to sub-question 260 (and its text box for an answer) responsive to the user selecting answer 252. It should be understood that in another embodiment question 250 could branch to question 264 responsive to answer 254, and alternatively branch instead solely to question 260 responsive to answer 252. That is, in this other embodiment, whether the first question, question 250, branches to a second one of the questions, question 260, or instead to a third one of the questions, question 264, depends on the answer received for the first question, question 250.

Figure 7:
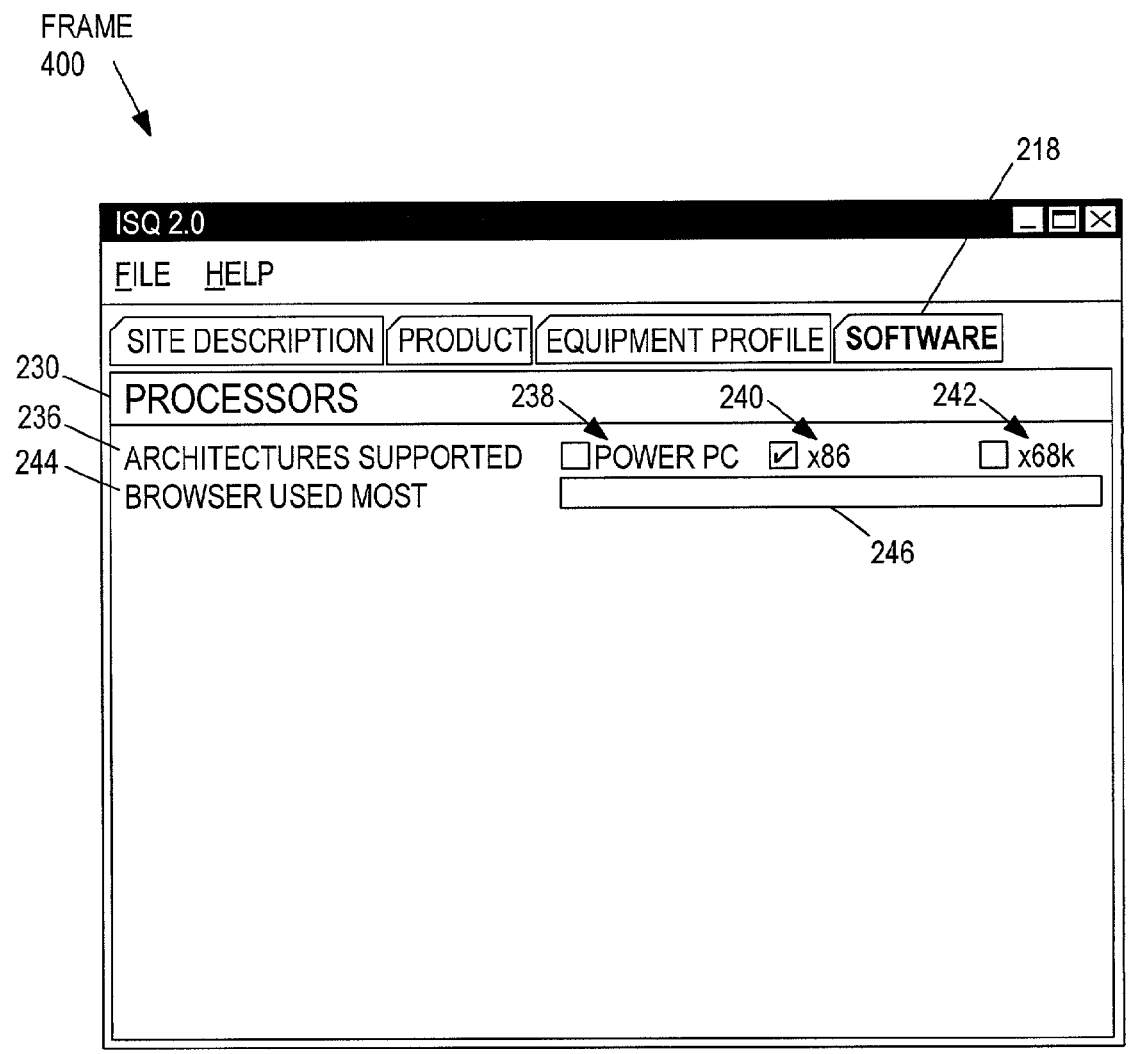
FIG. 7 illustrates the frame for an instance where the user has selected yet another set of answers, according to an embodiment of the invention.

Referring now to FIGS. 3 and 7 together, the frame 400 is shown in FIG. 7 for an instance where the user has selected answer 240 instead of answer 238. Since answer 240 does not cross reference any additional arrays, no questions and answers are rendered in addition to those of array 310 which were initially rendered, as was shown in the instance of frame 400 in FIG. 4.

Figure 8:
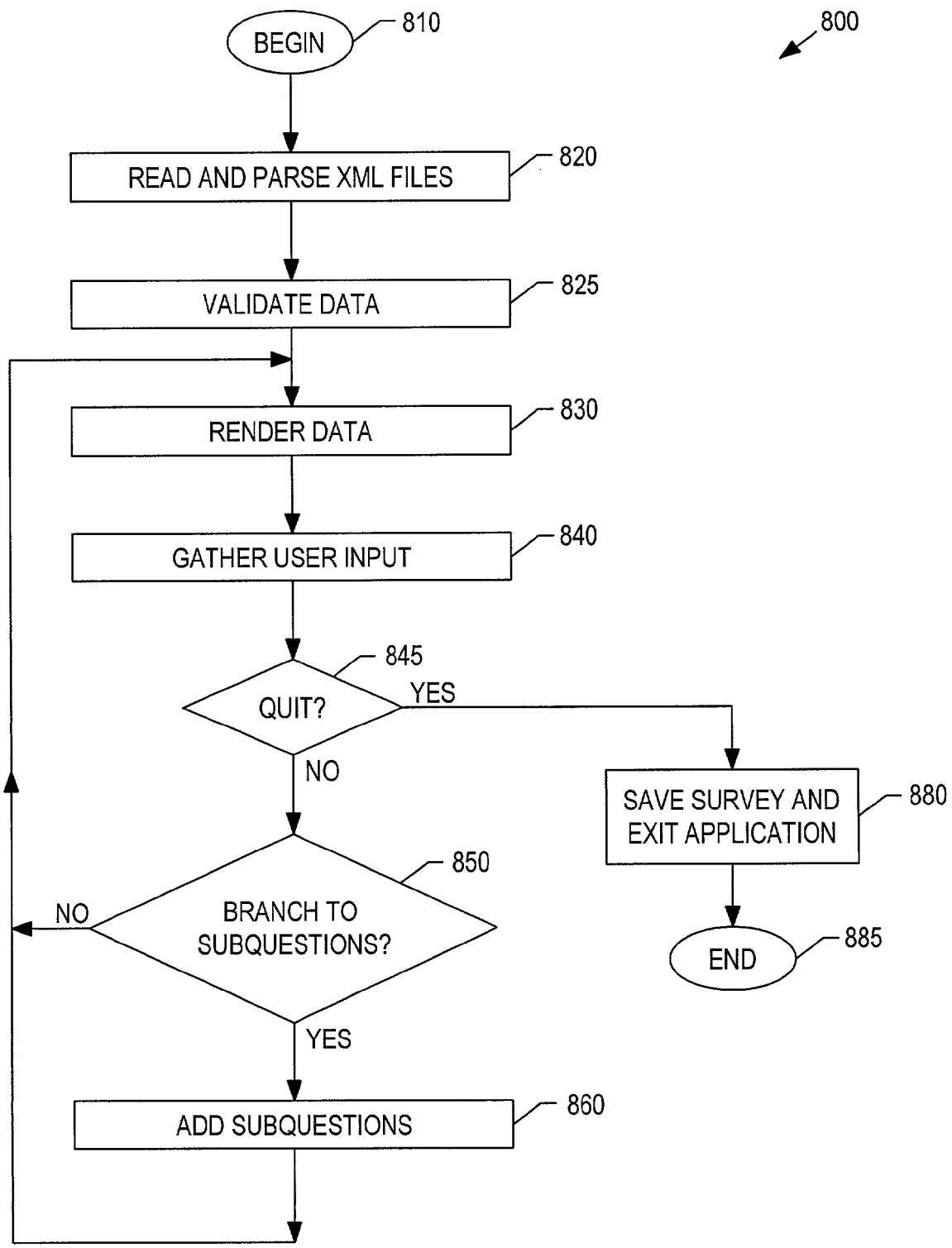
FIG. 8 illustrates, in a flow chart form, certain steps or instructions of the invention, according to an embodiment.

Referring now to FIG. 8, an algorithm 800 is shown for certain methods steps of the invention, according to an embodiment. The methods steps of the algorithm 800 are performed by the client 150 (FIG. 1) responsive to the programming instructions of the applet 120, XML document 133 and DTD document 132 (FIG. 1) provided to the client 150 by the server 110 (FIG. 1). After beginning at step 810, the applet 120 reads and parses the XML document 133 in step 820. Then, in step 825 the data is validated against the DTD document 132. Next, in step 830, the applet 120 provides the selected questions and answers to the browser for rendering by the browser 160 in a frame 135 (FIG. 1) of the browser window 165 (FIG. 1). Next, in step 840, user input is gathered. Next, in step 845, if the user on the client 150 user quits, the applet 120 branches to step 880 in which the applet 120 saves the survey results, sending the previously mentioned responsive XML document 128 (FIG. 1) back to the server 110 and terminates at 885.

If the user has not quit, then at step 850 the applet 120 determines from the user's selections and text box entries whether an answer given leads to another branch of questions. This is done by the applet 120 looking at the entry for an answer in the hash table portion of one of the arrays 126 (FIGS. 1 and 3) containing the answer. If yes, then at step 860 the applet 120 follows the chain of cross references in the arrays 126 beginning with the entry for the answer, and thereby compiles, for adding to the survey, the branch of sub-questions for the answer. Then the applet 120 provides the user provided answers and compiled sub-questions to the browser for rendering at step 830. Alternatively, if the applet 120 determines that the user's answer does not lead to another branch of sub-questions, then the applet merely provides the user selected answers to the browser without any new sub-questions for rendering at step 830.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

The description of the present embodiment has been presented for purposes of illustration, but is not intended to be exhaustive or to limit the invention to the form disclosed. Many additional aspects, modifications and variations are also contemplated and are intended to be encompassed within the scope of the following claims. For example, the embodiment has depicted the survey being rendered on a visual display device, but it should be understood that the survey could be rendered in other media, such as audio. It should also be understood that the client could take many forms, such says a desktop computer, laptop computer, notebook computer, personal digital assistant having a visual display and an audio player, or a more simple device having primarily, or even solely, an audio playback function. The client is depicted with a keyboard and mouse for user input, but other input devices are also contemplated, such as a microphone, for example.

What is claimed is:

1. A computer program product comprising a computer readable storage device storing executable instructions for generating a survey for a client on a network, the executable instructions comprising:

instructions for storing an HTML formatted survey document on a computer-readable storage device of a first computer system, the survey document having questions and answers in a certain format, wherein the questions and answers are for delivery in the survey document over a network to a second computer system and wherein the survey document is for presenting to a user by the second computer system i) ones of the survey document questions and ii) answers from the survey document for selecting on the second computer by the user of the second computer, wherein according to the certain format of the survey document, the questions and answers are defined as XML data elements included in the survey document as strings of text surrounded by text markups, including tags describing the data elements and attributes defining associations among the questions and answers, including associations such that ones of the questions branch from ones of the answers;

instructions for storing a document type definition file on the computer-readable storage device of the first computer system, the document type definition file being for delivery over the network to the second computer system, wherein programming instructions include instructions for causing the second computer system to validate the XML data elements responsive to the document type definition file; and instructions for storing an HTML formatted document and programming instructions on a computer-readable storage device of the first computer system, the programming instructions being written in an object oriented, interpreted, dynamic programming language and the HTML formatted document and programming instructions being for delivery over the network to the second computer system;

wherein the executable instructions further comprise first instructions for receipt and execution as an applet in a browser of the second computer system, wherein the execution of the instructions as an applet causes the second computer system to parse the data elements from the survey document into data arrays comprising a hash table having cross-references defining associations among questions and answers.

2. The computer program product of claim 1, wherein the executable instructions further comprise second instructions for receipt and execution as an applet in a browser of the second computer system, wherein the execution of the second instructions as an applet causes the second computer system to display in a browser on a user interface of the second computer system a first set of one or more of the questions and corresponding, selectable answers and causes the second computer system to then repeatedly select and display additional sets of one or more of the questions and corresponding, selectable answers is by the second computer and not the first computer and is responsive to answers selected by the user on the second computer, and wherein the repeated selecting by the second computer system is further responsive to ones of the cross-references of the data arrays arising from the second computer system parsing the data elements from the survey document; and third instructions for receipt and execution as an applet in a browser of the second computer system, wherein the execution of the third instructions as an applet causes the second computer to return survey results to the first computer system as an XML formatted answer response document defining the answers selected by the user as data elements included in the survey document as strings of text surrounded by text markups, including tags, wherein the text markups describe the data elements.

3. The computer program product of claim 2 wherein the programming language includes Java.

4. A server comprising:

a processor for connecting to a network;

a storage device coupled to the processor, wherein the storage device is for storing executable instructions for:

storing an HTML formatted survey document on a computer-readable storage device of a first computer system, the survey document having questions and answers in a certain format wherein the questions and answers are for delivery in the survey document over a network to a second computer system and wherein the survey document is for presenting to a user by the second computer system i) ones of the survey document questions and ii) answers from the survey document for selecting on the second computer by the user of the second computer, wherein according to the certain format of the survey document, the questions and answers are defined as XML data elements included in the survey document as strings of text surrounded by text markups, including tags describing the data elements and attributes defining associations among the questions and answers, including associations such that ones of the questions branch from ones of the answers;

storing a document type definition file on the computer-readable storage device of the first computer system, the document type definition file being for delivery over the network to the second computer system, wherein programming instructions include instructions for causing the second computer system to validate the XML data elements responsive to the document type definition file; and storing an HTML formatted document and programming instructions on a computer-readable storage device of the first computer system, the programming instructions being written in an object oriented, interpreted, dynamic programming language and the HTML formatted document and programming instructions being for delivery over the network to the second computer system, the programming instructions including:

first instructions for receipt and execution as an applet in a browser of the second computer system, wherein the execution of the first instructions as an applet causes the second computer system to parse the data elements from the survey document into data arrays comprising a hash table and having cross-references defining the associations among questions and answers;

second instructions for receipt and execution as an applet in a browser of the second computer system, wherein the execution of the second instructions as an applet causes the second computer system to display in a browser on a user interface of the second computer system a first set of one or more of the questions and corresponding, selectable answers and causes the second computer system to then repeatedly select and display additional sets of one or more of the questions and corresponding, selectable answers, wherein the repeated selecting and displaying of the additional sets of one or more of the questions and corresponding, selectable answers is by the second computer and not the first computer and is responsive to answers selected by the user on the second computer, and wherein the repeated selecting by the second computer system is further responsive to ones of the cross-references of the data arrays arising from the second computer system parsing the data elements from the survey document; and third instructions for receipt and execution as an applet in a browser of the second computer system, wherein the execution of the third instructions as an applet causes the second computer to return survey results to the first computer system as an XML formatted answer response document defining the answers selected by the user as data elements included in the survey document as strings of text surrounded by text markups, including tags, wherein the text markups describe the data elements.

5. The server of claim 4 wherein the programming language includes Java.

6. A computer program product comprising a computer readable storage device storing executable instructions for generating a survey, the executable instructions comprising:

instructions for storing an XML survey document in a memory of a first computer system, wherein the XML survey document comprises a plurality of questions and corresponding answer options, a root node and a plurality of sub-nodes branching from the root node, wherein each question and corresponding answer options are defined as XML data elements, wherein attributes define the associations among the XML data elements and define question branches;

instructions for sending programming instructions to a second computer system for execution as an applet in a browser of the second computer system and a document type definition file, wherein the execution of the programming instructions as an applet causes the second computer system to parse the data elements into a plurality of data arrays using the document type definition file, wherein each data array in the plurality of data arrays comprises a hash table and cross-references defining associations among each question and corresponding answer options in the plurality of questions and corresponding answer options and identifying additional questions and corresponding answer options;

instructions for providing a question and corresponding answer options, from the plurality of questions and corresponding answer options, to a user on the second computer system;

instructions for receiving a user input comprising user selected answer options responsive to the provided question;

instructions for traversing the each data array to determine whether the user selected answer options identifies additional questions and corresponding answer options; and instructions for presenting the additional questions and corresponding answer options to the user on the second computer system responsive to determining that the user selected answer options identifies the additional questions and corresponding answer options.

7. The computer program product of claim 6 wherein each sub-node in the plurality of the sub-nodes comprises attributes defining categories for each question and corresponding answer options in the plurality of questions and corresponding answer options.

8. The computer program product of claim 6 further comprising:

instructions for generating a document object model data structure responsive to receiving the user input in response to presenting a question and corresponding answer options to the user on the second computer, wherein the document object model data structure is stored in the memory of the first computer system;

instructions for generating a responding survey document comprising the user inputted answers; and instructions for storing the responding survey document in the memory of the first computer system, responsive to receiving the responding survey document.

* * * * *